March 31, 1970   J. R. NASICA   3,503,826
PROCESS FOR LABELLING HOLLOW OBJECTS
Filed Jan. 17, 1968
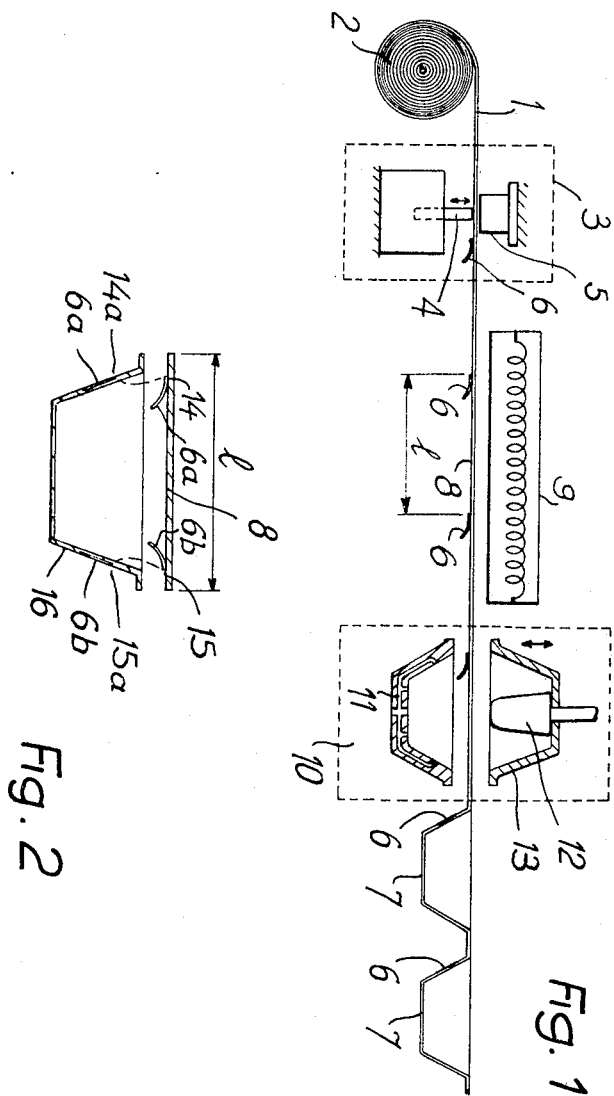
INVENTOR
JEAN ROGER NASICA
BY
ATTORNEYS

United States Patent Office 3,503,826
Patented Mar. 31, 1970

3,503,826
PROCESS FOR LABELLING HOLLOW OBJECTS
Jean Roger Nasica, Paris, France, assignor to Societe Anonyme dite: ERCA, Bagneux, France, a French society
Filed Jan. 17, 1968, Ser. No. 698,581
Claims priority, application France, Jan. 18, 1967, 91,514
Int. Cl. B29b; B29c 19/00
U.S. Cl. 156—245                    5 Claims

ABSTRACT OF THE DISCLOSURE

Process for labeling hollow objects wherein a label is fixed by at least a portion of one of its sides to the exterior portion of a film of thermoplastic to be formed. The fixed side of this label extends in a direction which is perpendicular to that in which the plastic flows when the object is formed and is fixed to the zone wherein the smallest flow of the thermoplastic with respect to the other points of the label occurs. The portion of the film which is to be formed into the object is heated. The heated portion of the film with its attached label is then placed over a mold and deformed in such a manner that it takes the internal form of the mold.

---

The present invention relates to a process for labeling hollow objects such as containers made from, bands, films or pellicles of thermoplastic material.

It is already known that a container may be provided with a label when formed of plastic material. This is done by placing a label in the female part of a forming mold before applying the hot thermoplastic material which, on taking the form of the mold, partially embeds the label in its mass. The label then appears on the face of the container.

According to this known process for labeling, the actual placing of the label in the mold is difficult, and is usually done by hand because it may not be done automatically. Furthermore, the adherence of the label held in a layer of the thermoplastic film is bad if the label is cold. If the label is heated before it is put in place in the mold, it is rapidly cooled before coming into contact with the hot thermoplastic film because the mold is cold and the interval of time between the placing of the label in the mold and the actual forming of the thermoplastic container is too large for eliminating the recooling of the label.

The present invention overcomes the handicaps mentioned-above and has for an object a process for labeling a hollow thermoplastic object which permits the automatique placing of the labels in a mold and the attachment of these labels to the hollow objects at the same time as the forming of the latter without it being necessary to apply the labels against the internal walls of the molds.

According to the invention, the process of labeling a hollow object made from a band, a film or a pellicle of thermoplastic material is characterized in that before the deformation of the band, at least one part of the border or edge of the label is fixed on the face of the band, which face will constitute the exterior face of the finally formed hollow object. The fixed edge or border of the label is fixed to the thermoplastic material in such a manner that the direction of this fixed edge is perpendicular to the direction of the movement or flowing of the molecules of the thermoplastic material when the object is formed by extension and that this edge is fixed to the zone of the band of thermoplastic material which has the smallest flow with respect to the other points of the label. The band is then heated at least on the portion thereof which is to be formed into a hollow object. This heated part of the band, provided with the label, is placed over a mold and then deformed in such a manner that it takes the internal form of the mold.

In this manner, the label which, in general, is not thermoformable, but thermosticking, does not in any way impede the forming of the hollow object, is automatically put in place with all the desired precision and adheres perfectly to the formed hollow object.

The present invention will be more clearly understood when referring to the following description of one embodiment of the invention when taken with the accompanying drawing in which:

FIGURE 1 shows a schematic view of the different operational phases of the process in accordance with the invention; and FIGURE 2 shows in section, a hollow object and the portion of the band from which the hollow object is formed.

Referring now to FIGURE 1, there is shown a band of plastic material 1 which is unwound step by step from a roll 2 and which passes through a labeling machine 3 which consists of a labeling die 4 disposed under the band 1 and an abutment 5 disposed in the same vertical plane but placed just above the band 1. The die 4 fixes the labels 6 on the lower face of the band 1. This lower face will, after the forming of the hollow object, form the exterior face of the latter.

According to the invention, only a small section of one side of the label 6 is fixed on the band 1. The area of contact between the band 1 and the label 6 is advantageously in the zone having the least flow of the plastic material when the hollow object 7 is formed. Each hollow object 7, such as a pot or receptacle, is made from a measured portion 8 having a length 1.

Each side, or one or several points of the side of the ticket taken on a straight line, which are in contact with the band 1, are in the marginal of fringe zone of each measured portion 8. Preferably, this marginal zone is at the most equal to about one-sixth of the length of the measured portion 8, so that the side by which the ticket 6 is provisionally fixed on the band 1 is perpendicular to the length or to the width of the measured portion 8. In the case shown in FIGURE 1, the contact side of the label 6 is perpendicular to the length of the measured portion 8.

The band 1 provided with the label 6 then passes through a heating station 9 where the different measured portions 8 and the corresponding labels 6 are heated to a predetermined temperature.

After this phase of the operation, the band 1, or more precisely, the measured portion 8, is brought step by step to the forming station 10 comprising a female mold 11, a forming die 12 and a bell-shaped holding member 13, which are all movable in a plane perpendicular to that of the band 1.

During the forming operation, the measured portion 8 is situated in such a manner that the edges of the measured portion coincide with the edges of the mold 11. The edge of the label 6 fixed on the band 1 is always found in the marginal zone of the measured portion 8 and the opposite free side of the label 6 is found opposite or in the neighborhood of the central zone of the measured portion 8.

Thus, as shown in FIGURE 2, the label 6a is fixed to the measured portion 8 by its near side 14 and the label 6b being fixed there by its forward side 15. The two areas of fixation 14, 15 are situated in the marginal zones of the measured portion 8. The length of the labels 6a, 6b is evidently a function of the depth of the hollow object that is to be made. The area of fixation 14 or 15 is placed at the edge of the measured portion 8 because of the flowing of the plastic material at the time of forming the hollow object 16. Since these areas 14 and 15 are situated in the marginal zones of the measured portion 8, the flowing of the plastic is very small (see distances 14–14a and 15–15a) and the tickets 6a and 6b is conveniently placed at the desired location. The time period between which the label and the measured portion come into contact with the internal wall of the mold is very short, and as a result does not allow any premature cooling of the label. The labels 6a or 6b are firmly held on their sides and on their rear faces by the thermoplastic material which makes up the hollow objects 7 or 16.

The forming process of the hollow object may be of any known type and will not be described in detail in the present case. As shown in FIGURE 1, the hollow object is formed by applying a vacuum to the heated band thus forcing the band into a female mold 11. The die 12 is used to initially deform the band the vacuum is applied to the mold 11.

According to one advantageous mode of operation of this invention, the band 1 is first heated and the edge of the label 6 is then fixed to the band. The edge is made perpendicular to the direction of displacement of the band 1. Then, the band 1 is already free of its internal tensions when the label is fixed. This permits an accurate determination of where the label will be placed on the finished hollow object and eliminates the differences in tension which are usually established between the band and the side of the label in contact with the band. Also, the temperature of the preheated band assures the automatic adherence of the label and eliminates any requirement for heating the labeling die 4. It is obvious that for this embodiment of the process, the heating station 9 is placed at the outlet of the roll of material 2 and the labeling apparatus 3 is placed between the heating station 9 and the forming station 10.

Of course, the mode of utilizing the process of this invention is not limited to the examples given above, but may include a system wherein several labels aligned in series perpendicularly to the direction of displacement of the band may be fixed simultaneously and/or the forming may be done under pressure.

What is claimed is:

1. A labeling process for hollow objects made from a film of thermoplastic material, comprising the steps of:
   fixing a label by one of its edges to the film of thermoplastic in such a manner that it will appear on the exterior of the hollow object to be formed, the label being fixed to the thermoplastic material so that the fixed side extends in a direction perpendicular to that in which the thermoplastic flows when the hollow object is formed and being fixed to a zone wherein the smallest flow of the thermoplastic film occurs with respect to the other points of the label,
   heating the portion of the film which is to be formed into a hollow object,
   placing the heated portion of the film with the label thereon over a mold, and
   deforming the heated portion in such a manner that it takes the internal form of the mold and such that the label is completely adhered to said portion.

2. The process of claim 1 wherein the edge of the label is fixed on a measured portion of the film so that it is found in a marginal portion which is at its maximum equal to a sixth of the length or of the width of the measured portion.

3. The process of claim 1 wherein the one of the sides of the label is applied with heat to the film and the film is then heated.

4. A labeling process for hollow objects made from a film of thermoplastic material, comprising the steps of:
   heating the portion of the film which is to be formed into a hollow object,
   fixing a label by one of its edges to the heated portion of the film in such a manner that it will appear on the exterior of the hollow object to be formed, the label being fixed to the film so that the fixed side extends in a direction perpendicular to that in which the film flows when the hollow object is formed and being fixed to a zone wherein the smallest flow of the film occurs with respect to the other points of the label,
   placing the heated portion of the film with the label thereon over a mold, and
   deforming the heated portion in such a manner that it takes the internal form of the mold and such that the label is completely adhered to said portion.

5. The process of claim 4 wherein the edge of the label is fixed on a measured portion of the film so that it is found in a marginal portion which is at its maximum equal to a sixth of the length or of the width of the measured portion.

References Cited

UNITED STATES PATENTS 2,792,593   5/1957   Hardgrove.
3,261,734   7/1966   Long.

ROBERT F. WHITE, Primary Examiner

J. H. SILBAUGH, Assistant Examiner

U.S. Cl. X.R.

156—306; 264—92, 93, 322